United States Patent
Schwarz et al.

(10) Patent No.: US 11,473,675 B2
(45) Date of Patent: Oct. 18, 2022

(54) METHOD FOR HOLDING A VEHICLE ON A GRADIENT

(71) Applicant: ZF Friedrichshafen AG, Friedrichshafen (DE)

(72) Inventors: Andreas Schwarz, Langenargen (DE); Thomas Kurz, Langenargen (DE); Sven Bieber, Markdorf (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 43 days.

(21) Appl. No.: 17/049,702

(22) PCT Filed: Mar. 19, 2019

(86) PCT No.: PCT/EP2019/056856
§ 371 (c)(1),
(2) Date: Oct. 22, 2020

(87) PCT Pub. No.: WO2019/206523
PCT Pub. Date: Oct. 31, 2019

(65) Prior Publication Data
US 2021/0207709 A1 Jul. 8, 2021

(30) Foreign Application Priority Data
Apr. 23, 2018 (DE) ............... 10 2018 206 204.8

(51) Int. Cl.
*F16H 61/20* (2006.01)
*F16H 61/00* (2006.01)

(52) U.S. Cl.
CPC ......... *F16H 61/20* (2013.01); *F16H 61/0059* (2013.01); *F16H 2061/205* (2013.01)

(58) Field of Classification Search
CPC ............... F16H 2061/205; F16H 61/20; F16H 61/0059; B60W 30/18054; B60W 30/18118
See application file for complete search history.

(56) References Cited

U.S. PATENT DOCUMENTS

| | | | | |
|---|---|---|---|---|
| 2002/0065170 A1* | 5/2002 | Suzuki | ................ | F16H 61/20 477/901 |
| 2008/0195267 A1* | 8/2008 | Miranda | ................ | B60K 6/48 701/22 |

(Continued)

FOREIGN PATENT DOCUMENTS

| DE | 102 59 424 A1 | 7/2004 |
|---|---|---|
| DE | 10 2012 016 042 B3 | 12/2013 |

(Continued)

OTHER PUBLICATIONS

International Search Report Corresponding to PCT/EP2019/056856 dated Jun. 25, 2019.

(Continued)

*Primary Examiner* — Ernesto A Suarez
*Assistant Examiner* — Lori Wu
(74) *Attorney, Agent, or Firm* — Finch & Maloney PLLC; Jay S. Franklin; Michael J. Bujold

(57) ABSTRACT

A method for holding a vehicle on a gradient. The vehicle has a transmission with an output, a first clutch and a second clutch. The primary sides of the first and second clutches are mechanically operatively connected to one another. The secondary sides of the first and second clutches are mechanically operatively connected to one another and to the output of the transmission. Different transmission ratios can be engaged by way of the first clutch and the second clutch, and the first clutch is in an engaged state. The method includes the additional closure of the second clutch in order to block (Continued)

the transmission and thus hold the vehicle at a standstill on a gradient.

6 Claims, 2 Drawing Sheets

(56) References Cited

U.S. PATENT DOCUMENTS

| | | | |
|---|---|---|---|
| 2012/0000743 A1* | 1/2012 | Wittkopp | F16H 63/3425 |
| | | | 192/219.1 |
| 2013/0304340 A1* | 11/2013 | Shattuck | B60W 10/10 |
| | | | 701/68 |
| 2017/0089460 A1 | 3/2017 | Yoon | |
| 2019/0111906 A1* | 4/2019 | Tetsu | B60W 30/18118 |

FOREIGN PATENT DOCUMENTS

| | | |
|---|---|---|
| FR | 2 919 701 A1 | 2/2009 |
| WO | 2009/130553 A1 | 10/2009 |

OTHER PUBLICATIONS

Written Opinion Corresponding to PCT/EP2019/056856 dated Jun. 25, 2019.

\* cited by examiner

METHOD FOR HOLDING A VEHICLE ON A GRADIENT

This application is a National Stage completion of PCT/EP2019/056856 filed Mar. 19, 2019, which claims priority from German patent application serial no. 10 2018 206 204.8 filed Apr. 23, 2018.

FIELD OF THE INVENTION

The present invention relates to a method for holding a vehicle on a gradient. The vehicle comprises a transmission with a first and a second clutch, whose primary and secondary sides are mechanically functionally connected to one another. By means of the first and second clutches different gear ratios can be engaged. In addition, the present invention relates to a control device for carrying out the method, to a transmission with such a control device and to a vehicle with such a transmission.

BACKGROUND OF THE INVENTION

Numerous working machines comprise a drive unit for propelling the machine and a working hydraulic system for carrying out working tasks, both of which can be powered by an internal combustion engine. As can be seen from DE 102 59 424 A1, the drive unit can comprise a powershift transmission with a hydrodynamic torque converter. If a lot of power is demanded from the working hydraulic system, the drive unit can be decoupled from the internal combustion engine, for example by opening a clutch in the powershift transmission of the drive unit. On efficiency grounds such decoupling can be appropriate even when braking, in order to avoid conflict between the motor and the brakes. Decoupling or at least reducing the coupling between the internal combustion engine and the drive unit can be called "inching". If the working machine is on a gradient and inching is to be terminated, a reduction of the braking force must be accompanied by a correspondingly matched increase of the traction force in order to prevent the working machine from rolling backward. For this, present-day working machines require complex control logic since the braking force depends on the temperature, the tolerances of the pedals and brake valves, and on other parameters.

US2017/0089460 A1 describes a method for preventing a vehicle from sliding backwards.

FR 2 919 701 describes a transmission with parallel shafts which can hold a vehicle on a slope.

DE 102 59 424 A1 describes a power shift multi-speed reversing gear.

DE 10 2012 016 042 B3 describes a method for operating an automatic transmission of a motor vehicle, which enables a holding mode by establishing several different torque connections between a connecting shaft and an output shaft.

WO 2009/130553 A1 describes a vehicle transmission arrangement in which more than one gear can be engaged to lock the transmission and thus hold the vehicle.

SUMMARY OF THE INVENTION

The present invention relates to a method for holding a vehicle on a gradient. The vehicle can be a working machine such as a building machine or an agricultural machine. The working machine can be a wheel loader or a tractor. Likewise, the vehicle can be a truck or a passenger car. When a vehicle is on a gradient, a downhill force acts upon it. The vehicle comprises a transmission with a drive output, a first clutch and a second clutch. The transmission can be a powershift transmission with a hydrodynamic torque converter. The clutches can be frictional shifting devices, for example disk clutches.

In the context of the method the primary sides of the first and second clutches are mechanically functionally connected. Moreover the secondary sides of the first and second clutches are mechanically functionally connected with one another and with the drive output of the transmission. In addition the wheels of the vehicle can also be mechanically functionally connected with the drive output of the transmission. A clutch comprises essentially two parts, namely a primary or drive input side via which power is introduced into the clutch, and a secondary or drive output side via which the power is transmitted. If two elements are mechanically functionally connected, they are coupled directly or indirectly with one another in such manner that a movement of one element brings about a reaction of the other element. Between the elements further elements, for example one or more gear stages can be provided. In the context of the invention the transmission of the vehicle can be designed such that there is a permanent mechanical functional connection between the primary and secondary sides of the clutches, or this can be bypassed by actuating one or more shifting elements.

Furthermore, the transmission is designed such that by means of the first clutch a gear ratio can be engaged, which is different from the gear ratio engaged by means of the second clutch. In other words, depending on the clutch engaged different rotational speeds and/or torques are applied at the drive output of the transmission. The gear ratios can differ in their amount and/or their sign.

In the initial condition of the present method the first clutch of the transmission is closed. A closed clutch is understood to mean a condition in which the primary side of the clutch is connected to the secondary side in a rotationally fixed manner. In such a closed condition the structural elements connected directly to the clutch consequently rotate in the same way. If the clutch concerned is a frictional clutch, rotational speed differences between the structural elements can exist even after the clutch has been actuated. In the context of the invention, however, this wanted or even unwanted condition is still regarded as a rotationally fixed connection of the structural elements concerned. The speed differences can depend on a degree of opening of the clutch. For example, if the clutch is fully closed the rotational speed differences can be smaller than with an only slightly closed clutch.

In addition to the first clutch, in the context of the method of the invention the second clutch is closed. Since the first and second clutches engage different gear ratios, the transmission is blocked by the engagement of the second clutch. Due to this blocked condition the vehicle can be held on an incline independently of the vehicle's brakes. Thus, the holding of the vehicle takes place transmission-internally and is consequently little prone to failure.

The closing process of the second clutch can in this case be initiated as a function of the drive output rotational speed of the transmission, or a brake pedal position, or a current torque of the vehicle drive, or an accelerator pedal position, or a currently engaged gear, or the engine speed, and/or other parameters. In one embodiment, for example, the closing of the second clutch can be initiated by an inching command.

Before the second clutch is closed, the method also comprises a reduction of the speed of the vehicle. During this the first clutch is in the closed condition. The speed can be reduced linearly or along some other fixed curve. The method further includes detecting a standstill of the vehicle while the first clutch is closed. The speed of the vehicle can be reduced until standstill of the vehicle is detected. As soon as the vehicle is at rest, the second clutch can be closed in order to block the transmission as described above. Since the second clutch is closed with the vehicle at rest, the loading of transmission components can be kept low.

In this case the reduction of the speed includes the opening of a drive input clutch of the transmission. The drive input clutch can be a frictional clutch, such as a disk clutch. For example, the drive input clutch can be a drive-direction clutch for engaging forward or reverse driving. Since in the context of the present method the vehicle is on an incline, while the vehicle is at rest the drive input clutch can also be partially closed. Thus, a torque can be transmitted to the wheels of the vehicle, which counteracts the downhill force.

The method also comprises the application of torque to the drive input clutch with the second clutch closed. The torque is applied by closing the drive input clutch. In that case the torque applied has a value sufficient to prevent the vehicle from rolling back on an incline. The second clutch can then be opened in order to terminate the blocked condition of the transmission. As a result reliable starting off on the incline can be carried out transmission-internally, regardless of the vehicle's brakes. Consequently the tolerances and temperatures of the brake system are not relevant, which results in a starting process with little likelihood of problems. Particularly with working machines this can be advantageous because rolling back on an incline due to the very high vehicle mass can lead to dangerous situations.

The initiation of the opening process of the second clutch can take place as a function of a brake pedal position, a current torque of the drive unit, an accelerator pedal position, the engine speed and/or other parameters. In an embodiment the opening of the second clutch can also be initiated, for example, by a command to terminate an inching process.

Before the second clutch is closed, the method further comprises storing a torque applied at the drive input clutch when the vehicle is at rest. As explained earlier, this torque applied at the drive input clutch may be necessary for overcoming the downhill force. The stored torque is also applied again at the drive input clutch before the second clutch is opened. In that way, in a simple manner a torque can be determined which prevents rolling back of the vehicle when the second clutch is opened. Moreover, the loading of transmission components can be kept low.

The mechanical functional connection on the primary sides can be realized by means of a gear chain and the mechanical functional connection on the secondary sides by a further gear chain. A gear chain is understood to mean a set of gearwheels or other mechanical elements which are permanently in mechanical functional connection with one another. If one element of a gear chain moves, this always brings about a movement of all the other elements of the gear chain. Furthermore the transmission can comprise an input gear chain which is mechanically functionally connected with the drive input of the transmission. When the drive input of the transmission rotates, this always results in rotation of all the elements of the input gear chain. By means of a drive input clutch a mechanical functional connection between the input gear chain and the gear chains on the primary sides of the clutches can be bypassed. The drive input clutch can be designed as described above. By virtue of these embodiments transmission-internal holding and/or starting off on an incline can be realized with a compact transmission.

The present invention also relates to a control unit for a transmission of a vehicle, which device is designed to carry out the method according to any of the embodiments described above. In the present case the setting up of a control unit for carrying out a method is understood to mean the specific preparation, i.e. the programming of the control unit for carrying out the method. The invention also relates to a transmission for a vehicle with such a control unit, and to a vehicle with such a transmission. As regards the understanding of the individual features and their advantages, reference should be made to the explanations given above.

DETAILED DESCRIPTION OF THE PREFERRED EMBODIMENTS

Figure 1:
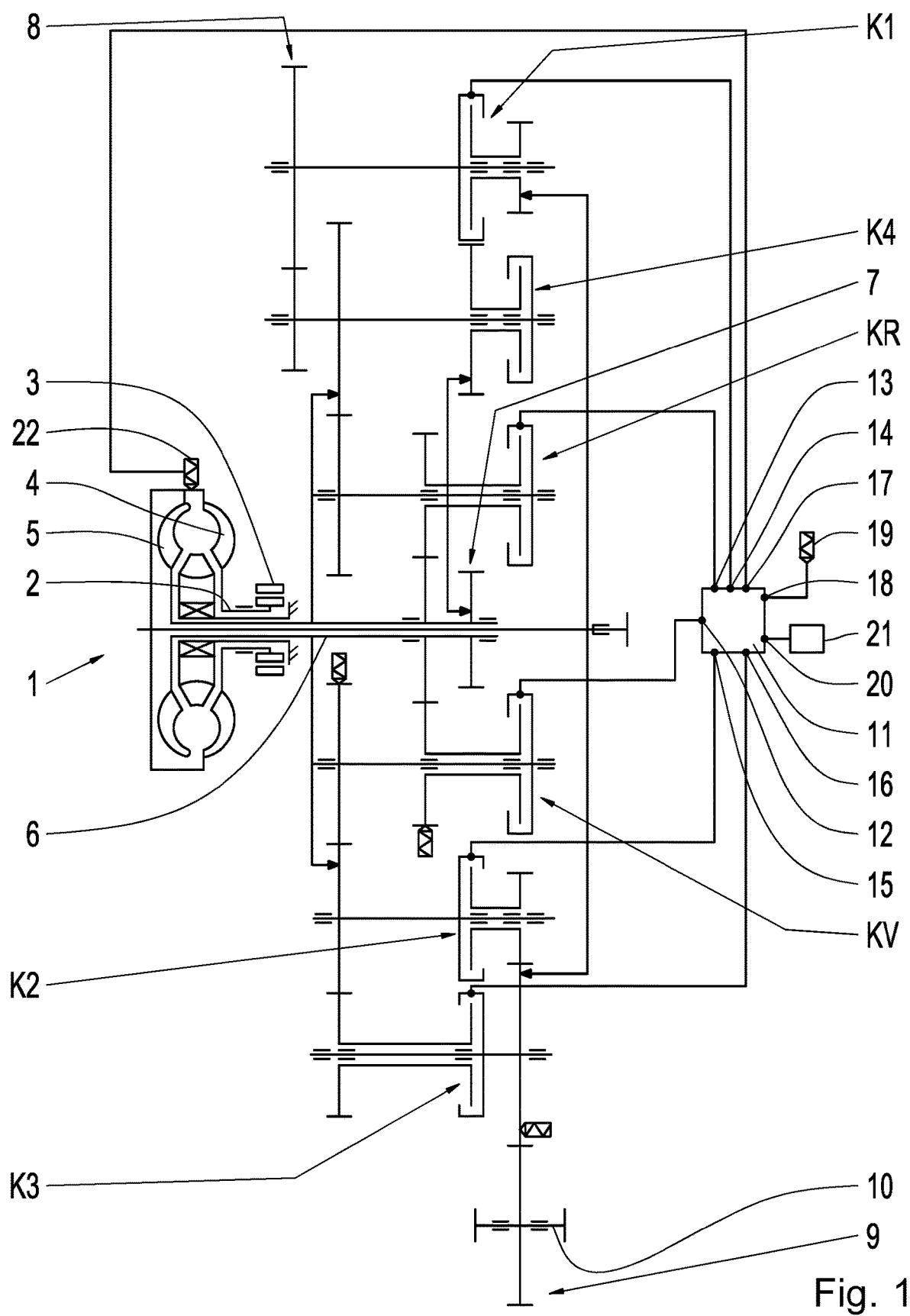
FIG. 1: illustrates schematically the structure of a transmission according to an embodiment of the present invention.

FIG. 1 shows the structure of a transmission 1 for a working machine, according to an embodiment of the present invention. The transmission 1 comprises a drive input 2 which is mechanically functionally connected to an internal combustion engine (not shown). To the drive input 2 is permanently connected in a rotationally fixed manner a pump 3 of a working hydraulic system (not shown) of the working machine. Likewise, the pump wheel 4 of a hydrodynamic torque converter is permanently connected in a rotationally fixed manner to the drive input 2. The turbine wheel 5 of the torque converter is permanently connected in a rotationally fixed manner to a hollow shaft 6.

A permanent rotationally fixed connection of two elements is understood to mean a connection in which the two elements are solidly coupled to one another in any intended conditions of the transmission. The elements can be present as individual components connected rotationally fixed to one another, or even integrally, in one piece.

The transmission 1 also comprises three gear chains 7, 8 and 9. Each of the gear chains 7, 8 and 9 comprises a plurality of shafts and gearwheels, in each case in permanent mechanically functional connection with one another. This means that a movement of one element in a gear chain results in a movement of every other element of the gear chain. The first gear chain 7 of the transmission 1 is permanently connected rotationally fixed to the hollow shaft 6, which in turn is permanently connected rotationally fixed to the turbine wheel 5 of the torque converter. Thus, when the turbine wheel 5 of the torque converter rotates, this results in a movement of all the elements of the first gear chain 7.

In the direction of the hollow shaft 6 the first gear chain 7 is arranged between the second gear chain 8 and the third gear chain 9. The second gear chain 8 is on the side of the first gear chain 7 facing toward the torque converter and the third gear chain 9 is on the side facing away from the torque converter.

In addition the transmission 1 comprises three clutches, KV, KR and K4 by means of which the first gear chain 7 can in each case be connected rotationally fixed to the second gear chain 8. In this embodiment all the clutches are in the form of disk clutches. If none of the clutches is actuated, there is no rotationally fixed connection between the first gear chain 7 and the second gear chain 8. One of the clutches KV is a driving direction clutch for forward driving and another clutch KR is a driving direction clutch for driving in reverse. By actuating the driving direction clutch KV the working machine can be driven in the forward direction and by actuating the driving direction clutch KR it can be driven in the reverse direction.

Furthermore, the transmission 1 comprises three gear clutches K1, K2, K3, by means of which the second gear chain 8 can in each case be connected rotationally fixed to the third gear chain 9. The primary sides of the three clutches K1, K2, K3 are functionally connected to one another by way of the second gear chain 8. The secondary sides of the three clutches K1, K2, K3 are functionally connected with one another via the third gear chain 9. If none of the clutches K1, K2, K3 is actuated, there is no rotationally fixed connection between the second gear chain 8 and the third gear chain 9. The drive output 10 of the transmission 1 is permanently connected rotationally fixed to an element of the third gear chain 9, so that movement of an element of the third gear chain 9 results in movement of the drive output 10. In this embodiment all the gear clutches are in the form of disk clutches.

Moreover, the transmission 1 is designed in such manner that by means of the gear clutches K1, K2, K3 different gear ratios between the drive input 2 and the drive output 10 of the transmission 1 can be engaged. In this embodiment, a first gear of the transmission 1 can be engaged by means of the first clutch K1, a second gear by the second clutch K2 and a third gear of the transmission 1 by the third clutch K3. Accordingly, by virtue of the interaction of the drive direction clutches KV and KR and the gear clutches K1, K2 and K3, several gears in the forward and reverse directions can be obtained with the transmission 1 in this embodiment.

In addition the transmission 1 in the present embodiment comprises a control unit 11 with a forward interface 12 and a reverse interface 13. The forward interface 12 is connected to the driving direction clutch KV for forward driving and the reverse interface 13 is connected to the driving direction clutch KR for reverse driving. Likewise, the control unit has three gear interfaces 14, 15, 16 which are connected respectively with the clutches K1, K2, K3 for the first, second or third gears. The clutches KV, KR, K1, K2 and K3 can be engaged by the control unit 11 via the interfaces 12, 13, 14, 15, 16. The control unit 11 also comprises a speed interface 18, which is connected to a driving speed sensor 19 for detecting the driving speed of the working machine. Furthermore the control unit 11 comprises a torque interface 17 connected to a torque sensor 22. By means of the torque sensor 22, a rotational speed ratio between the pump wheel 4 and the turbine wheel 5 of the torque converter can be determined. From this a torque can be determined, which is applied at the closed driving direction clutch KV, KR. In addition the control unit 11 comprises an inching interface 20 for detecting an inching command. The inching command can be issued by a driver of the working machine by way of an input device 21, for example an inching pedal.

Figure 2:
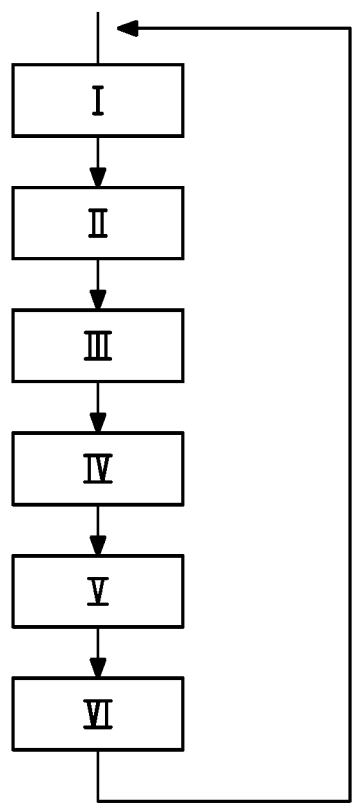
FIG. 2: shows a flow chart for a method for starting off on an incline, with a vehicle according to an embodiment of the present invention.
Figure 3:
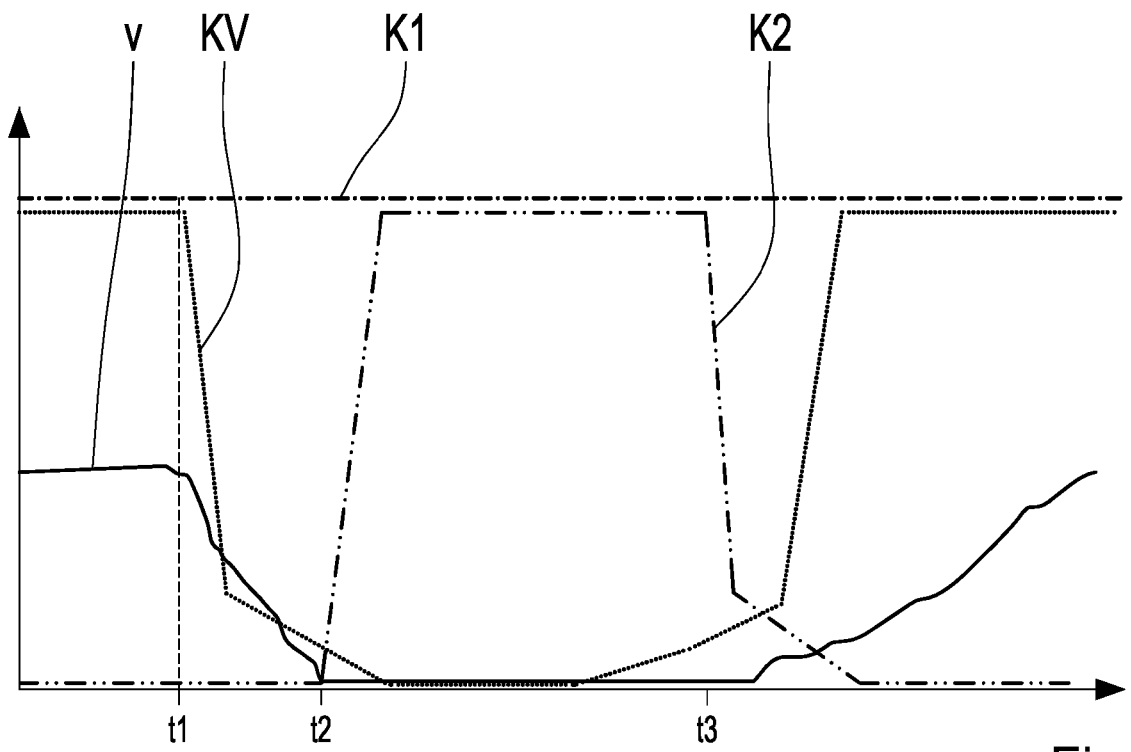
FIG. 3: shows example shifting sequences of the clutches of the transmission in FIG. 1, when carrying out the method according to FIG. 2.

The control unit 11 is designed to carry out the method described in what follows with reference to FIGS. 2 and 3. In FIG. 3 the driving speed v of the working machine and the torques that can be transmitted by the clutches K1, K2 and KV are plotted against time t. In an initial condition the working machine drives in the forward direction at a constant speed in the first gear, so the clutches K1 and KV are fully closed and can transmit the maximum torque. All the other clutches of the transmission 1 are fully open and cannot therefore transmit any torque.

In a first step I, by way of the inching interface 20 an inching command input by means of the input device 21 is detected. In the example shown in FIG. 3, this takes place at time $t_1$. In this embodiment, the working machine is on an incline. In response to the command the control unit 11, via the forward interface 12, opens the driving direction clutch KV for forward driving along a steady opening function. The farther the clutch KV opens, the less torque can be transmitted by it and the slower is the working machine.

During the opening of the driving direction clutch KV, by way of the speed interface 18 and the driving speed sensor 19 the driving speed is monitored and in a step II a standstill of the working machine is detected. Since in this embodiment the working machine is on an incline, at rest a torque is still applied at the driving direction clutch KV which holds the working machine on the incline and prevents any rolling back.

In a following step III, in this embodiment the torque applied at rest at the driving direction clutch KV is determined via the torque interface 17 and the torque sensor 22, and is stored in a memory (not shown) of the control unit 11.

Thereafter, in a step IV, in addition to the first clutch K1 the gear clutch K2 for the second gear is closed by way of the clutch interface 15. The transmission 1 is then blocked and can hold the working machine on the incline. In the example shown in FIG. 3 closing is initiated at time $t_2$. Alternatively, the third gear clutch K3 too is closed. Then, with the gear clutch K2 closed the clutch KV is fully opened, so that no torque can be transmitted by it. The full power of the internal combustion engine is thus available for the working hydraulic system.

If in a step V a command is detected via the inching interface 20 to terminate the inching condition, the control unit 11 closes the clutch KV via the forward interface 12 until the torque previously stored in step III is applied at the clutch KV. The torque applied is monitored via the torque interface 17 and the torque sensor 22. In the example shown in FIG. 3 this condition exists at time $t_3$.

Thereafter, in a step VI the control unit 11 opens the clutch K2 via the clutch interface 15. The clutch KV is fully closed, so that with the gear clutch K1 closed the vehicle starts off on the incline in first gear and the inching condition is terminated. Then, the method reverts to step I.

INDEXES

1 Transmission
2 Drive input
3 Pump of the working hydraulic system
4 Pump wheel of the torque converter
5 Turbine wheel of the torque converter
6 Hollow shaft
7 First gear chain
8 Second gear chain
9 Third gear chain
10 Drive output
11 Control unit
12 Forward interface
13 Reverse interface
14, 15, 16 Clutch interfaces
17 Torque interface
18 Speed interface
19 Driving speed sensor 20 Inching interface
21 Input device
22 Torque sensor
KV Driving direction clutch for the forward direction
KR Driving direction clutch for the reverse direction
K1, K2, K3 Gear clutch for the first, second and third gears
v; t Driving speed; time
I Open the driving direction clutch
II Detect standstill
III Store the torque at rest
IV Close the additional gear clutch
V Apply the torque at rest
VI Open the additional gear clutch

The invention claimed is:

1. A method for holding a vehicle on an incline, the vehicle including a transmission with a drive output, a first clutch and a second clutch, wherein primary sides of the first and the second clutches are mechanically in functional connection with one another, and secondary sides of the first and the second clutches are mechanically in functional connection with one another and with the drive output of the transmission, and different gear ratios are engagable by way of the first clutch and the second clutch, and the method comprising, when the first clutch is engaged:

reducing the speed of the vehicle while the first clutch is engaged;

the reduction of the speed of the vehicle includes, opening of a drive input clutch of the transmission;

detecting a standstill of the vehicle while the first clutch is engaged;

storing a torque applied at the drive input clutch while the vehicle is at rest and before the second clutch is engaged;

engaging the second clutch in order to block the transmission and hold the vehicle at a standstill on the incline;

while the second clutch is engaged, closing the drive input clutch to apply the stored torque at the drive input clutch the applied torque preventing the vehicle from rolling back; and disengaging the second clutch to terminate blocking of the transmission and starting off of the vehicle on the incline.

2. The method according to claim 1, further comprising realizing the mechanical functional connection between the primary sides by a gear chain and realizing the mechanical functional connection between the secondary sides by a further gear chain.

3. The method according to claim 1, wherein the transmission has an input gear chain which is functionally connected to a drive input of the transmission such that, by actuating the drive input clutch, a mechanical functional connection between the input gear chain and a gear chain of the primary sides of the first and the second clutches is bypassed.

4. A control unit for a transmission of a vehicle, which is designed to carry out the method according to claim 3.

5. A transmission for a vehicle, with the control unit according to claim 4.

6. A vehicle with the transmission according to claim 5.

* * * * *